United States Patent [19]

Carrol

[11] Patent Number: 5,082,574
[45] Date of Patent: Jan. 21, 1992

[54] APPARATUS FOR TREATMENT OF MATERIAL WITH LIQUID WITH STIRRER DRIVEN VORTEX FLOW

[75] Inventor: Alan Carrol, London, United Kingdom

[73] Assignee: Trenchbond Limited, London, England

[21] Appl. No.: 378,825

[22] Filed: Jul. 12, 1989

[30] Foreign Application Priority Data

Jul. 18, 1988 [GB] United Kingdom ............... 8817036

[51] Int. Cl.⁵ ............................................. B01D 17/038
[52] U.S. Cl. ................................. 210/787; 210/197; 210/512.3; 422/119; 422/269; 422/278; 422/281; 422/295
[58] Field of Search ............... 210/178, 179, 511, 634, 210/637, 787, 90, 180, 512.3, 805; 422/259, 269, 275, 278, 281, 296, 119, 258, 288, 295; 366/262, 263, 270, 273, 274; D7/412

[56] References Cited

U.S. PATENT DOCUMENTS

| D. 281,722 | 12/1985 | Carrol | D7/412 |
|---|---|---|---|
| 2,627,977 | 2/1953 | Kent | 422/278 |
| 2,892,620 | 6/1959 | Johnston | 422/269 |
| 3,495,946 | 2/1970 | Hudson | 422/269 |
| 3,650,950 | 3/1972 | White | 210/197 |
| 4,680,112 | 7/1987 | Carrol | 210/179 |

FOREIGN PATENT DOCUMENTS

| 162902 | 9/1984 | Japan | 422/269 |
|---|---|---|---|
| 562306 | 6/1977 | U.S.S.R. | 422/296 |
| 724163 | 3/1980 | U.S.S.R. | 422/259 |

Primary Examiner—Robert A. Dawson
Assistant Examiner—Joseph Drodge
Attorney, Agent, or Firm—Fitzpatrick, Cella, Harper & Scinto

[57] ABSTRACT

An apparatus for treating material with liquid has defined therein a cylindrical chamber, suspended above the bottom of which is a receptacle for holding the material to be tested, the bottom of which receptacle is permeable to the treatment liquid. Above the receptacle there is arranged a duct with inlets at its end and outlets disposed above the receptacle. In use, a magnetic stirrer drives a vortex of liquid up the side wall of the chamber and liquid from the vortex enters the duct from which liquid pours down onto the material to be treated in the receptacle and is then recycled. The apparatus includes one or more of the improvements that suspension of the receptacle and duct is by means which does not interfere with the vortex, that the area of the inlets is maximized by forming them with an arcuate profile, and that the bore in the duct is formed such that the wall above the bore is relatively thick and a suspending rod can be screwed thereinto.

19 Claims, 4 Drawing Sheets

APPARATUS FOR TREATMENT OF MATERIAL WITH LIQUID WITH STIRRER DRIVEN VORTEX FLOW

BACKGROUND OF THE INVENTION

1. Field of the Invention

This invention relates to an apparatus for treatment of a material with a liquid, for example in the separation of one or more substances from a mixture of two or more substances using a solvent selective for at least one substance in the mixture.

2. Description of the Prior Art

There are many procedures in which a material is treated with a liquid and in which it is desirable for the material to be thoroughly treated by all the available liquid. For example, in laboratory procedure it is often desired to separate mixtures of substances or to purify an impure substance by solvent separation in which the mixture or substance to be treated is contacted with solvent in which at least one of the substances to be separated, an impurity or a substance to be purified is selectively soluble. Another example is in laboratory scale experimental dyeing techniques.

It would be desirable to provide an apparatus for at least partially automated convenient and efficient performance of such techniques.

In applicant's U.S. Pat. No. 4,680,112 and its equivalent European patent application published under No. 0148629 there is described an apparatus which attempts to provide such an improved way of separating a mixture of substances with a liquid, for example in the purification of an impure substance. The apparatus is a vortex-type liquid treatment device and its essential features are that it has therein a substantially cylindrical chamber and contains means to form liquid in the apparatus into a vortex. Within the chamber is held a receptacle for the material to be treated and there is arranged means to receive liquid from the vortex and conduct the liquid to outlet means above material in the receptacle and from which the liquid pours on the material. The bottom of the receptacle is permeable to the liquid, which flows from the receptacle to re-enter the vortex and be recycled. Preferably in such apparatus the container comprises a bottom portion and a lid portion. Further the means for driving the vortex generally comprises stirring means, and a third preferred feature is that the liquid receiving means comprises a duct member suspended across the interior of the chamber, the ends of the duct member each having an inlet disposed for ingress into the duct member of liquid forming a vortex and the duct member comprising the outlet above the bottom wall of the receptacle.

In the specific vortex-type apparatus of U.S. Pat. No. 4,680,112 there is an internal sleeve in the chamber which sits on the bottom wall of the apparatus. At the top of the sleeve there are spokes which extend radially inwardly to the receptacle which is held thereby. The means for receiving liquid from the vortex comprises a duct extending across the chamber with openings at its ends for ingress of liquid and a slit in the bottom thereof disposed above the interior of the receptacle, the openings being arranged for inflow of liquid from the vortex.

Applicant's apparatus described above has been found to be effective in practice as well as relatively easy, and hence economical, to make. Notwithstanding these advantageous features, it has now been appreciated that the successful operation of the apparatus could be made even more efficient and that its manufacture can be further simplified.

One operational improvement which has been perceived resides in improving the flow of the vortex. Observation of applicant's earlier apparatus has shown that the vortex is satisfactorily driven to the diametric duct, but it is now realised that interference of the inner sleeve and the spokes decreases the efficiency of operation. However, perception of this opportunity for improvement raised the further problem of providing a solution which still enabled ready manufacture.

SUMMARY OF THE INVENTION

One aspect of the present invention resides in a vortex-type liquid treatment apparatus in which the receptacle for material to be treated and the means to receive liquid from the vortex are suspended from above so that the means for holding the receptacle and said liquid receiving means do not interfere with the vortex. This arrangement may be very conveniently achieved by suspending the receptacle and said means directly or indirectly from the lid of the apparatus.

A second operational improvement which has been devised is to improve the ingress into the liquid receiving means of liquid forming the vortex of vortex-type liquid treatment apparatus. It has been found that this may conveniently be achieved by forming the inlets in said means with maximum cross-sectional area in the region on which the liquid impinges, by forming each inlet such that when viewed from above or below it has a profile approximately of a concave arc of a circle.

The third aspect of the invention resides in the appreciation that the suspension of the cross-duct of applicant's earlier vortex-type liquid treatment apparatus may be more easily and economically achieved and the aperture means for outpouring of liquid from the duct concomitantly more readily be made by making the duct member as an element in which a conduit or bore is defined such that the wall above the conduit is thicker than the wall therebelow and by screwing a suspension member into a threaded hole in the top wall. The thin bottom wall facilitates manufacture of the aperture means and the thick upper wall enables the elongate element to be screwed rather than welded to the suspension means, which is of considerable benefit, especially when the apparatus is made of stainless steel.

DETAILED DESCRIPTION OF THE INVENTION

Figure 1:
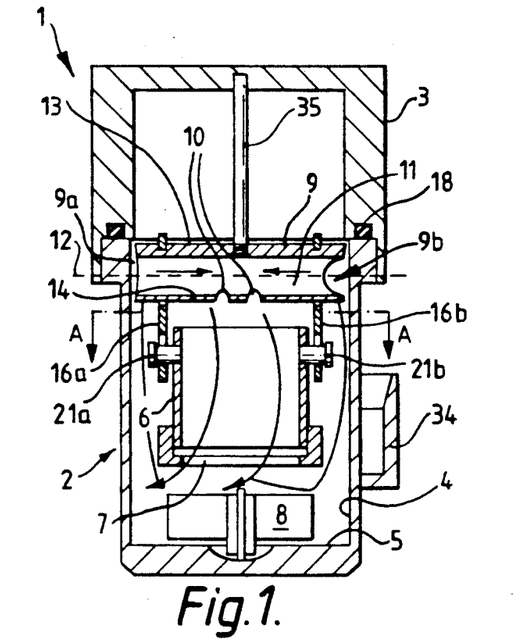
FIG. 1 is a longitudinal cross-section through an apparatus according to the invention.
Figure 2:
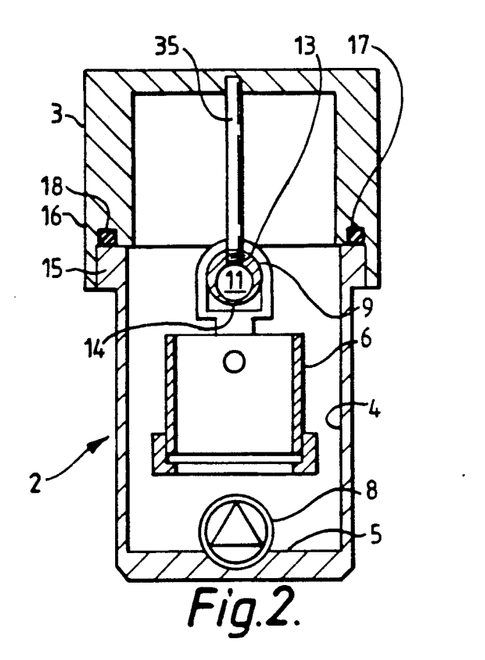
FIG. 2 is a longitudinal cross-section through the apparatus of FIG. 1 at right angles to the section of FIG. 1.
Figure 3:
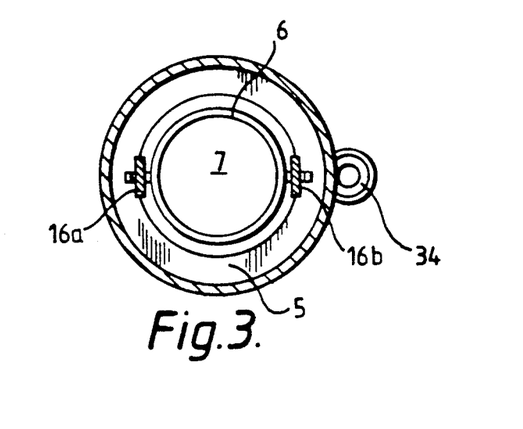
FIG. 3 is a horizontal cross section along line A—A of FIG. 1.

In a first embodiment of the invention there is provided an apparatus of which an example is shown in FIGS. 1 to 3 and which comprises a container 1 with a bottom portion 2 and a lid portion 3. The container 1 has defined therein a substantially cylindrical chamber 4 and has arranged above its bottom 5 a receptacle 6 for holding material (not shown) to be treated in the apparatus. The bottom 7 of the receptacle 6 is permeable to the liquid to be used in the apparatus. The apparatus further comprises stirring means 8 capable of creating a vortex running up the side of the chamber 4 of liquid in the container 1, the surface of which liquid when at rest is (or would be) lower than the bottom wall 7 of the receptacle 6.

Across the interior of the chamber 4 of the first embodiment there is arranged a duct member 9 at a height above the receptacle 6 and to which a vortex in the chamber 4 can be driven by the stirring means 8. The ends 9a, 9b of the duct member 9 each have an inlet arranged for ingress into the duct member 9 of liquid forming the vortex created during use of the apparatus; the duct member 9 has outlet means 10 from which in use liquid can pour onto material in the receptacle 6.

In the first embodiment, the duct member 9 and the receptacle 6 are held by means coupled directly or indirectly to the container 1 above the duct member 1, such that in use the suspension means does not interfere with a vortex running up to the duct member 9.

A second embodiment of the invention exemplified by FIGS. 1 to 3 comprises a container 1 with a bottom and lid portions 2 and 3, chamber 4, bottom 5, receptacle 6 with permeable bottom 7, stirring means 8, duct member 9 with ends 9a, 9b and outlet means 10 as described in connection with the first embodiment, except that the duct member 9 and receptacle 6 are not necessarily suspended from above as with the first embodiment and, in particular, the receptacle 6 may be supported from below for example by a sleeve of the type described in applicant's earlier U.S. Pat. No. 4,680,112 and EP 0148629.

Figures 4, 5, 6, 7:
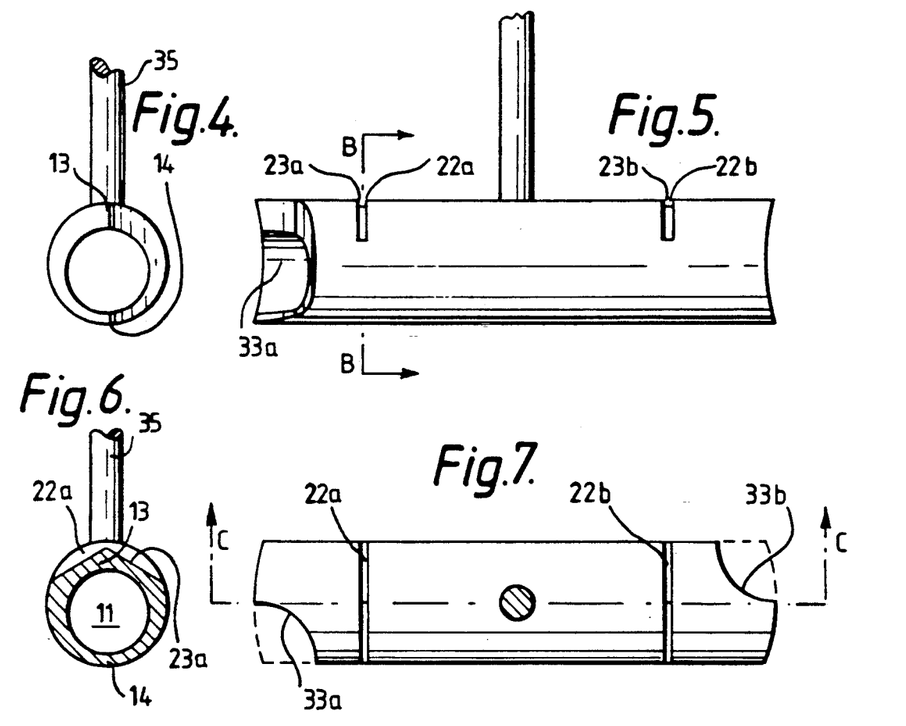
FIG. 4 is an end elevation of a modification of the duct of the apparatus of FIG. 1 in which there are three outlet holes.
FIG. 5 is a side elevation of the duct of FIG. 4.
FIG. 6 is a cross section along the line B—B in FIG. 5.
FIG. 7 is a top plan view of the duct of FIG. 4.

In the second embodiment each inlet of the duct member 9, when viewed in a direction parallel to the longitudinal axis of the chamber, has a profile which is substantially of a concave arc of a circle opening in a direction to receive liquid from the vortex. The profile of the inlets is illustrated in FIG. 7.

FIGS. 1 to 3 further illustrate a third embodiment of the invention, which comprises a container 1 with bottom and lid portions 2 and 3, chamber 4, bottom 5, receptacle 6 with permeable bottom 7, stirring means 8, duct member 9 with ends 9a, 9b and outlet means 10 as described in connection with the first and second embodiments. It will be understood that in the third embodiment it is not necessary for the receptable 6 and duct member 9 to be supported from above or for the duct inlets to be arcuate in profile.

In the third embodiment the duct member 9 comprises an elongate element in which is defined a longitudinal bore 11 whose axis 12 lies below the axis of the duct member 9, whereby the wall defining the bore 11 is thicker in the wall portion 13 above the bore 11 than in the wall portion 14 below the bore 11. The duct member 9 is suspended by a suspension member 35 with a threaded end portion screwed into the wall portion 13 above the bore 11, the end portion preferably being threaded in such a sense that in use the force of a vortex on the duct member 9 urges the duct member 9 to be screwed more tightly onto the suspension member 35. The other end of the suspension member 35 is coupled indirectly or, as illustrated, directly to the container 1. In the construction of FIG. 1, the suspension member 35 is coupled to the lid portion 3 of the container.

Considering the apparatus of FIGS. 1 to 3 in greater detail and by way of non-limiting example, the container 1 comprises a bottom portion 2 at the top of which is an outwardly extending flange 15 having a threaded circumference 16 onto which may be screwed a complementary threaded portion 17 of a lid portion 3. Alternative arrangements for screw-coupling of the bottom 2 and lid 3 are of course possible. In general, the manner in which the bottom 2 and lid 3 are held together does not matter so long as the lid 3 acts to prevent escape of liquid in use. Preferably the bottom 2 and lid 3 are sealingly closed together, for example by an O-ring 18. It is also preferable that the apparatus is adapted for the bottom 2 and lid 3 to be closed with a pressure-tight (pneumatic) seal which enables the apparatus to be operated at elevated pressure. By way of illustration only, the internal diameter of the container 1 may be of from 70 to 100 mm, e.g. about 90 mm and its height may be of from 15 to 25 cm, e.g. about 20 cm.

A substantially cylindrical chamber 4 is defined by the bottom portion 2, although it may also be partially defined by the lid portion 3. In the preferred embodiments in which the bottom 2 and lid 3 may be closed to form a pneumatic seal at elevated pressure, the apparatus optionally includes means for measuring the pressure in the chamber 4. The pressure measuring means may comprise a manometer (not shown) secured in the lid 3; in the apparatus adapted to operate at elevated pressure another optional feature is a safety valve in the lid of the apparatus.

Suspended from the lid 3 is a means to receive vortex liquid, viz a cross-duct 9, which may alternatively be suspended by other means which would not interfere with a liquid vortex running up the side wall of the chamber 4 as far as the duct 9. For example, the duct 9 could be suspended from a diametric cross piece whose ends are held in recesses formed in the top surface of the flange 15; however, this arrangement is less preferred as it would be difficult to locate the recesses with sufficient accuracy during manufacture and the cross piece and recesses would interfere with any excess vortex which flowed above the duct 9.

The duct 9 is suspended by suspension means or rod 35 screw-threaded into the lid 3 and the duct member 9, the direction of the threads at the top and bottom of the rod 35 preferably being in such a sense that in use the force of a vortex on the duct member 9 urges the duct member 9 to be screwed more tightly onto the rod 35 and the rod 35 to be screwed more tightly into the lid 3. The advantage of screw coupling of the rod at one or both ends thereof is that it simplifies and cheapens the construction of the apparatus as compared with welding, especially when the apparatus is made of stainless steel.

Typically, the vortex is created by a magnetic stirrer which, when viewed from above, creates a clockwise vortex and the threads on the rod 35 will thus be left hand threads in most cases.

The duct member 9 comprises an elongate element or tube in which is defined a bore 11. The bore 11 is eccentrically arranged in the tube such that its axis 12 is below the axis of the tube and the upper part 13 of the tube wall is thicker than the lower part 14 thereof. In this way the part 13 of the wall of the bore may be made thick enough to receive the rod 35 in a screw threaded arrangement without increasing the thickness of the tube wall about its entire circumference; moreover this eccentric arrangement of the bore 11 makes it easier to make outlet means from the bore 11 in the bottom thereof. Typically, the thickness of the wall directly above the bore is at least 2.5 mm and is usually not more than 5 mm; preferably it is from 3 mm to 4 mm. The thickness of the wall directly below the bore is generally not more than 1.5 mm and usually not less than 0.3 mm, a thickness of between 0.5 and 1 mm being more common. In the illustrated embodiment the outlet means is in the form of through-holes 10 but other means, e.g. a single longitudinal slot, may be provided.

Figure 11:
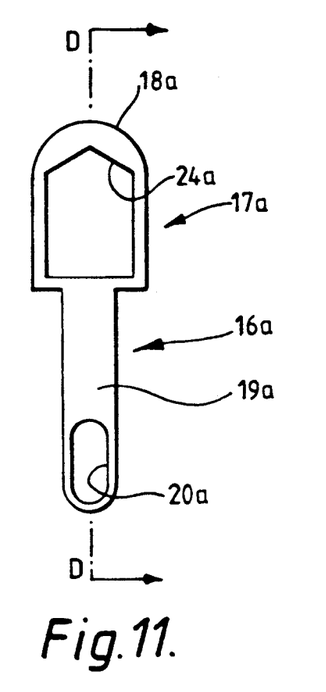
FIG. 11 is a view of an end face of a yoke member, a second yoke member arranged therebehind as in FIG. 1 being obscured from view.
Figure 12:
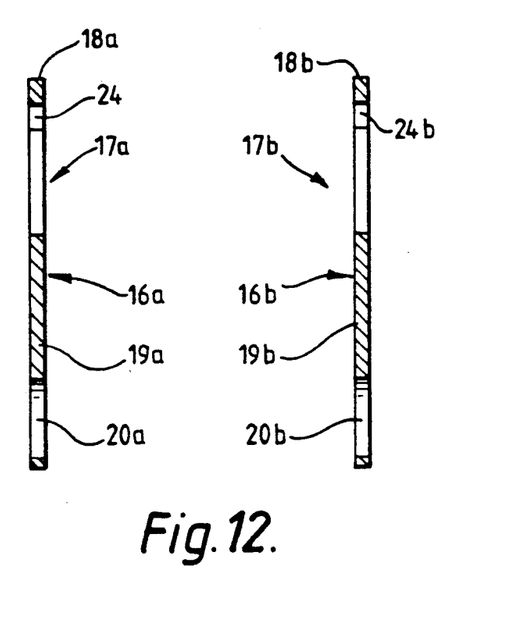
FIG. 12 is a cross section along line D—D of FIG. 11 through the pair of yoke members.

The outlet means 10 is arranged above a receptacle 6 for material to be treated. The receptacle 6 is suspended from the duct member 9, although alternative arrangements for suspending the duct member 9 from above may be used. Generally the duct member 9 is suspended directly or (as in the illustrated embodiment) indirectly from the lid 3. The receptacle 6 is preferably suspended from the duct member 9, for example by a pair of yoke members 16a, 16b. The yoke members 16a, 16b are best seen in FIGS. 11 and 12, where they can be seen to have upper ends 17a, 17b each comprising a hanging portion 18a, 18b which is located over and supported by a portion of the duct member 9. The hanging portions 18a, 18b may be in the form of a hook but preferably are as illustrated in the form of a loop from the bottom of which extend arms 19a, 19b having defined in their distal ends slots 20a, 20b.

The slots 20a, 20b receive complementary projections or lugs 21a, 21b extending outwardly from opposed sides of the receptacle 6, which is thus suspended via the yoke members 16a, 16b and the duct member 9 from the lid 3.

In a preferred embodiment, therefore, the receptacle 6 is suspended by a pair of yoke members, the lower ends of which hold the receptacle and the upper end of each of which yoke members comprises a hanging portion which is located over and supported by a portion of the duct member; as described by way of example in the following paragraph means are provided to prevent relative movement of the yoke members and the duct member during operation of the apparatus.

Referring to FIGS. 5, 6, 7 and 8, it can be seen that the outer surface of duct member 9 comprises a pair of recesses 22a, 22b in which the hanging portions 18a, 18b snugly sit. The recesses 22a, 22b extend over an upper portion of the outer surface of the duct member 9 and at least one has an angular seat 23a, 23b on which sits a complementary angular face 24a, 24b (FIGS. 11 and 12) of the respective yoke member 16a, 16b. By virtue of the matching angular seats 23a, 23b and faces 24a, 24b rotational movement of the yoke members about the duct member 9 should be prevented during normal operation of the apparatus, whilst the snug fitting of the hanging portions 18a, 18b in the recesses 22a, 22b (i.e. the closely matched widths of the recesses and hanging portions) likewise prevents appreciable movement of the yoke members longitudinally of the duct member 9. It is, however, within the scope of the invention to provide alternative arrangements to prevent such movement of the yoke members.

A preferred alternative to the illustrated design of yoke member is to form the yoke member as a single loop. At the top of the loop there is a straight crosspiece which sits snugly in a flat-bottomed groove defined in the top of the duct member 9. The bottom portion of the loop is shaped complementarily to lugs 21a, 21b.

Figure 13:
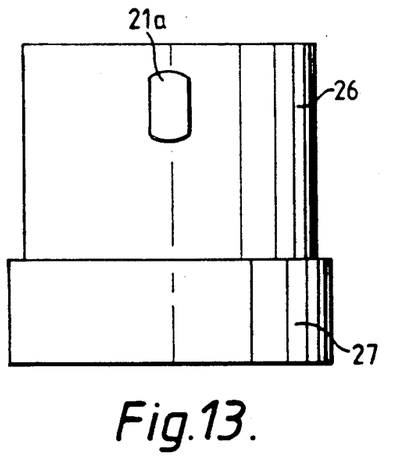
FIG. 13 is a side elevation of the receptacle of FIG. 1.
Figure 14:
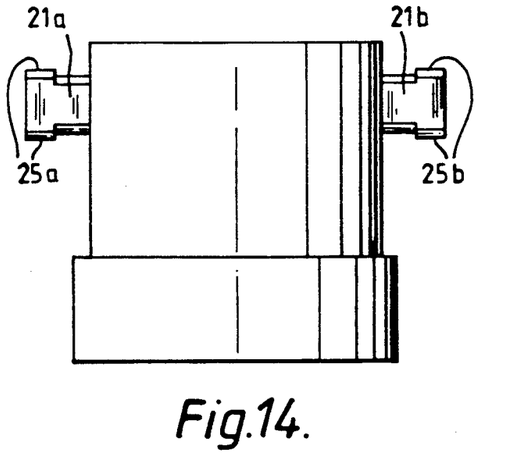
FIG. 14 is a side elevation of the receptacle of FIG. 13 at right angles to the elevation thereof.

The receptacle 6 is illustrated in greater detail in FIGS. 13 to 20. FIGS. 13 and 14 illustrate lugs 21a, 21b which are complementary to slots 20a, 20b inserted in the yoke members. The complementary shape is to prevent rotation of the receptacle 6 about the lugs 21a, 21b. The lugs have means, illustrated as discontinuous flanges 25a, 25b, at least on the bottom portions of the ends thereof to limit lateral movement of the receptacle 6.

Figures 15, 16:
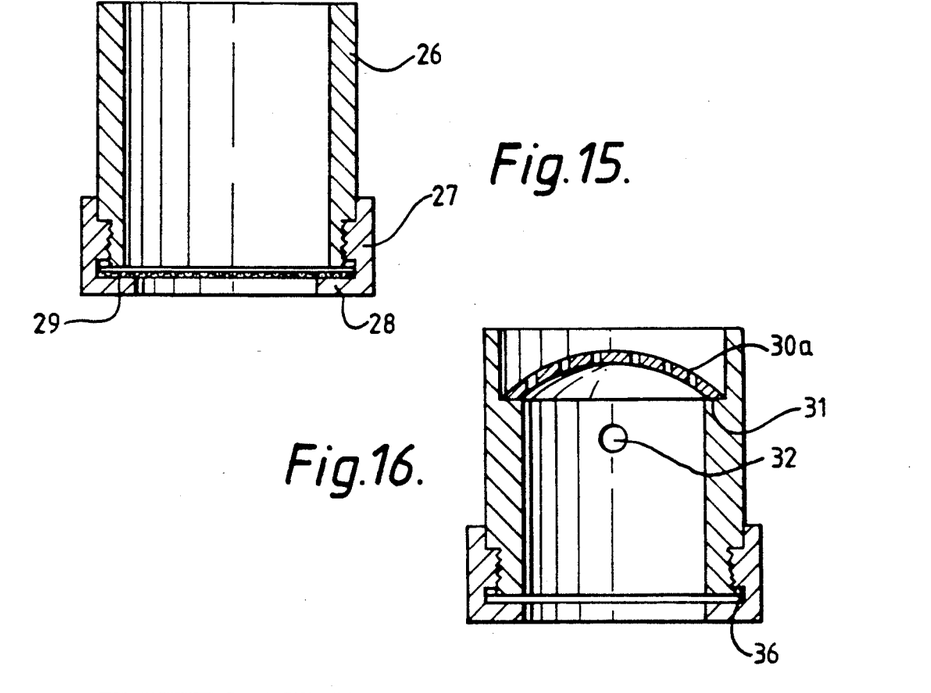
FIG. 15 is a cross section through the receptacle of FIG. 1 more detailed than the cross section shown in FIG. 2.
FIG. 16 is a cross section through a modification of the receptacle of FIG. 1 in which a domed apertured plate is provided.

The receptacle 6 comprises an externally threaded cylinder 26 screwed into an internally threaded base portion 27. The base portion has an inwardly extending flange 28 on which is seated means 29 to support the material to be treated and forming the bottom surface of the receptacle 6, the support means 29 being permeable to the treatment liquid. The cylinder 26 may be screwed down onto the support means 29 to secure it against the flange 28. Undercuts 30 permit the cylinder 26 be screwed down onto the support means 29. Typically, the support means 29 comprises a permeable layer optionally supported by a wire mesh. However, this construction of the receptacle is not critical and alternative arrangements in which the material to be treated can be supported on a permeable surface, for example support means 29, will be apparent to the skilled reader.

It is preferred that the apparatus comprise liquid distribution means whereby liquid flows from the duct member 9 onto the material to be treated relatively evenly over the material; for example, an apertured plate may be provided above the bottom surface (i.e. the support means 29) of the receptacle, above the space occupied by the material to be treated, which spreads the down pouring of the liquid onto the material.

Figure 17:
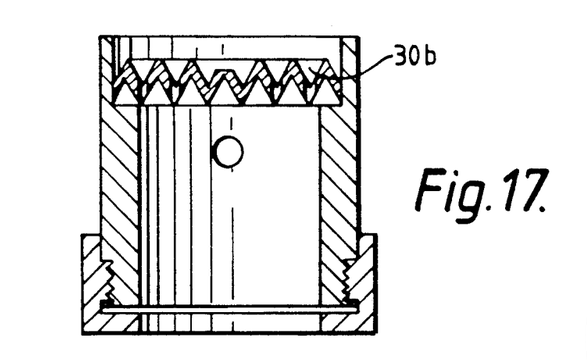
FIG. 17 is a cross section through a second modification of the receptacle of FIG. 1 in which a grooved apertured plate is provided.
Figure 18:
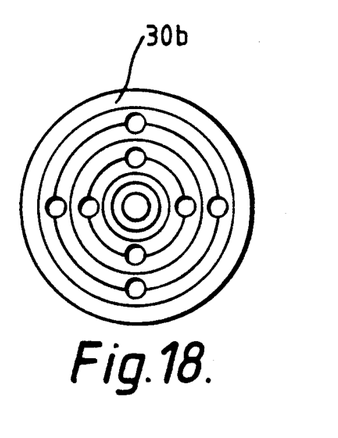
FIG. 18 is a plan view of the apertured plate of FIG. 17.
Figure 19:
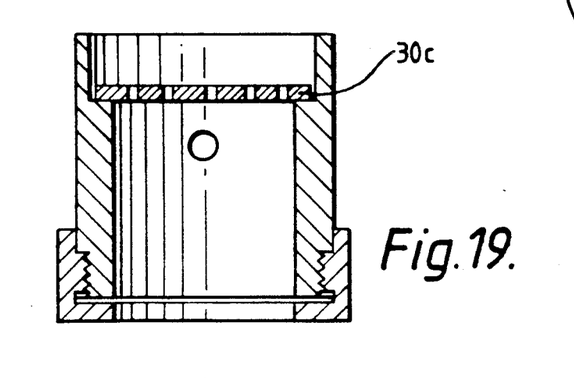
FIG. 19 is a cross section through a third modification of the receptacle of FIG. 1 in which a flat apertured plate is provided.

Referring now to FIGS. 16 to 19, the liquid distribution means in the illustrated embodiments comprises an apertured plate 30a, 30b, 30c supported by the receptacle 6 above the space where the material to be treated is located, for example the plate 30a, 30b, 30c may be supported on an annular shoulder 31 formed in the side wall of the cylinder 26. The aim of the apertured plates in the illustrated embodiments is to spread the downflow of liquid from the duct member 9 so that it pours over a substantial area of the liquid to be treated. The apertured plate may be flat as shown in FIG. 19 but, since it is anticipated that the downflow of the liquid will be greatest in the central region of the separator, it is contemplated that preferred plates will be designed to spread the liquid flow outward from the centre and the domed plate of FIG. 16 and the undulating plate or "ripple plate" of FIGS. 17 and 18 are intended to achieve this effect.

In order to improve flow of the liquid through the apertured plate 30a, 30b, 30c, vent means 32 may be provided in the side wall of the cylinder 26 below the apertured plate 30a, 30b, 30c. The vent means typically comprises one or two vent holes formed in the side wall and permits venting of air from the chamber formed below the apertured plate 30a, 30b, 30c. It will be appreciated that the receptacles of FIGS. 16, 17 and 19 will in practice include a permeable support means 29 as shown in FIG. 15, even though this is omitted from FIGS. 16, 17 and 19.

Reverting to the duct member 9, it has already been described that the duct member 9 is a form of means to receive vortex liquid. Each end 9a, 9b of the duct member has an inlet 33a, 33b disposed for ingress into the duct member of at least part of the liquid forming a vortex made during operation of the apparatus. The inlets 33a, 33b of the illustrated embodiment are best seen in FIGS. 5, 7, 9 and 10 and comprise laterally facing openings formed in the two end portions of the duct member 9. The inlets 33a, 33b open in a direction opposite to that of the vortex so that liquid forming the vortex can enter them, and for this reason they are diagonally opposed.

The ends 9a, 9b of the duct member 9 must self-evidently be arranged close enough to the side wall of the container 1 for the liquid to enter the inlets. However, there are disadvantages in the ends 9a, 9b touching the container side wall: firstly, if the liquid flow rate of the vortex is greater than the outflow rate through the outlet means 10 then a small clearance permits liquid to by-pass the duct member 9 rather than enter it whereas lack of appreciable clearance will result in trapping of the liquid by the duct and baffling of the vortex, with attendant interference with proper functioning of the apparatus; secondly, in the illustrated construction the ends 9a, 9b of the duct 9 would tend to scrape or jam against the side wall of the bottom portion 2 when the lid 3 with the depending duct 9 was screwed onto the bottom 2 if the duct ends 9a, 9b were a tight fit with the side wall of the bottom portion 2. There would be a risk of the second problem arising with any construction of the apparatus but the first problem could be controlled by limiting the flow rate of the vortex.

The duct ends 9a, 9b may therefore touch the side wall of the chamber 4 but are preferably spaced apart therefrom by a small (functional) clearance. Preferably the clearance at each of the ends 9a, 9b is from 0.05 to 0.5 mm, e.g. 0.1 to 0.2 mm, but it may be even greater for optimum functionality.

As a further measure to avoid baffling and to avoid reducing operational efficiency, the total size of the outlet means 10 is preferably at least as big as the sum of the liquid inlet areas of the inlets 33a, 33b. Ideally, the total liquid outflow area is substantially the same as the total liquid inflow area.

Figures 8, 9, 10:
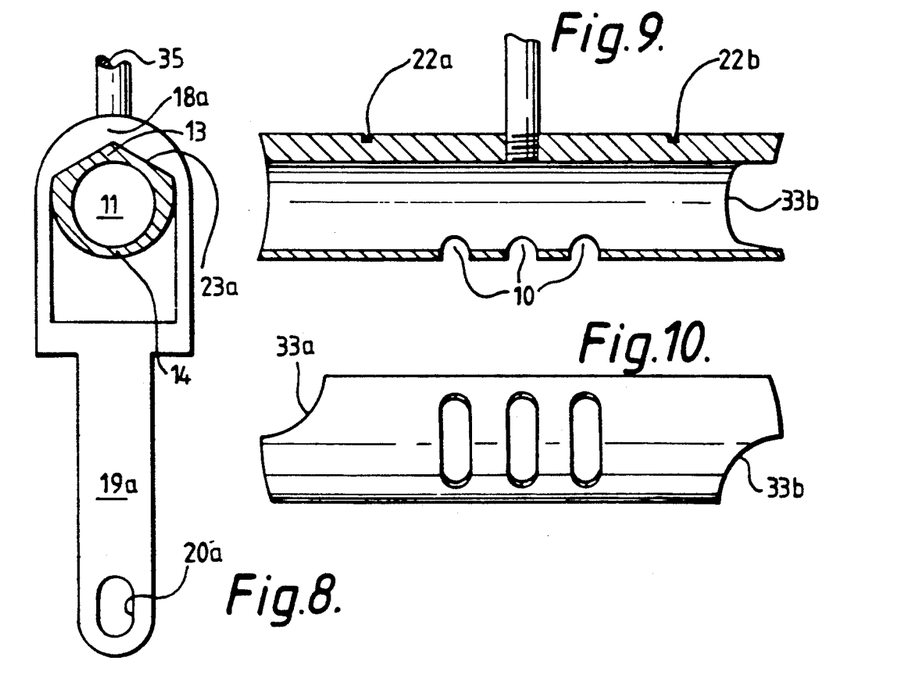
FIG. 8 is a cross section along the line B—B in FIG. 5 with the yoke member in place.
FIG. 9 is a cross section along line C—C in FIG. 7.
FIG. 10 is a bottom plan view of the duct of FIG. 4.

In many instances, and especially when the liquid outflow area is substantially no smaller than the inflow area, the rate of liquid egress from the duct member 9 might not limit the throughflow of liquid and in the illustrated embodiment the inlets 33a, 33b are configured to have substantially the maximum area and hence the maximum possible inflow rate by having a profile, as shown in FIGS. 7 and 10, which is approximately of a concave arc of a circle.

One essential feature of our apparatus is means, e.g. stirring means, to create a vortex and this is preferably in the form of a magnetic stirrer 8 (FIG. 1). The stirrer may be of any type but for maximum efficiency is preferably the type of magnetic stirrer illustrated in applicant's U.S. Pat. No. Des. 281,722.

For maximum flexibility of operation the apparatus preferably comprises heating and/or cooling means to heat or cool the chamber 4 and hence the treatment liquid. In particular, the apparatus preferably comprises such heater means and also temperature responsive means to enable the heater means to be controlled and hence the temperature to be regulated. At its simplest, the temperature responsive means may be a thermometer held in, for example, a well in the lid 3 to enable manual control of the heater means, but it preferably comprises a thermocouple received in a well 34 (FIGS. 1 and 3) formed exteriorly of the chamber 4 or otherwise aranged to measure the chamber temperature and a thermostat to which the thermocouple is connected and which is arranged to control the heater means. Whatever the form of the temperature responsive means, the heater means preferably comprises an electric element provided externally around at least a part of the side wall of the bottom portion 2 of the container 1.

One advantage of vortex-type liquid treatment apparatus is that it enables material to be treated with relatively little contact between the operator and the liquid. This feature may be enhanced by providing inlet and outlet duct means whereby liquid can be supplied to and exhausted from the chamber without exposure of the operator to the liquid or its fumes. There may thus be provided, for example, one or two appropriately arranged conduits, closable by valves or taps, for inlet and outlet of the liquid. This measure is of particular benefit if a noxious liquid, e.g. benzene, is used.

To use the apparatus, material to be treated is placed in the receptacle 6, the treatment liquid is poured into the apparatus up to a level below the bottom wall of the receptacle and the apparatus is operated to form a vortex. The vortex runs up the side wall of the chamber 4 to the liquid receiving means 9 into which flows at least part of the vortex liquid, and whence the liquid exits through outlet means 10 and falls onto the material to be treated, optionally after passing through an apertured plate or other liquid distributor. The liquid then passes through the permeable support means 29 and falls back to the bottom of the apparatus to be recycled.

It is most convenient to place the material to be treated into the receptacle after first removing the receptacle from the yoke means, or the receptacle and the yoke means from the duct member, and subsequently reassembling the apparatus before screwing the lid of the container to its bottom.

The stirring bar 8 may be driven by a standard magnetic stirring drive and, in any event, the drive must generally operate in such a direction as to tighten the screw couplings by which the duct 9 is connected to the lid 3.

After use both the treated material and the liquid are removed from the apparatus. If appropriate, substances extracted into the liquid may be isolated therefrom by standard procedures, for example. In many cases, the apparatus is used to purify, separate or otherwise treat substances which, when purified, separated or otherwise treated, are subjected to one or more further processes or treatments to obtain a useful end product. Accordingly, the invention encompasses not only materials isolated or treated using the method or apparatus of the invention, but any substance or product obtained directly or indirectly using a substance treated or isolated (whether by separation, purification or otherwise) using the method or apparatus of the invention.

The apparatus of the invention may be used in a method of separating at least one substance from a mixture of two or more substances using a solvent selective for at least one substance in the mixture, the method comprising placing the mixture of substances in the receptacle of the apparatus, filling the container of the apparatus with the solvent to a level below the bottom wall of the receptacle, operating the apparatus to form the solvent into a vortex, ceasing operation of the apparatus, removing the solvent containing the separated substance(s), removing the remnant of the mixture from the receptacle, and optionally isolating the separated substance(s) from the solvent. The method may further comprise subjecting one or more substances removed from the separator to one or more additional treatments and/or reactions.

What is claimed is:

1. An apparatus for treating material with liquid, comprising:
    a container comprising a bottom portion and a lid portion, the container having defined therein a substantially cylindrical chamber having a longitudinal axis, an interior and a side;
    a receptacle for holding the material to be treated, said receptacle having a bottom wall permeable to a treatment liquid to be used in the apparatus, said bottom wall being arranged above the bottom portion of the container;
    stirring means capable of driving up the side of the chamber a vortex of said liquid having a direction of flow, the surface of said liquid at rest being lower than the bottom wall of the receptacle; and
    a duct member arranged diametrically across the interior of the chamber above the receptacle at a height to which the liquid vortex can be driven, the duct member having opposite ends, each of said ends comprising an inlet disposed for ingress of liquid forming the vortex into the duct member, each inlet having a profile of a concave arc of a circle opening in a direction opposite to said direction of flow of the liquid vortex when viewed along lines which lie within the chamber parallel to the longitudinal axis of the chamber, the duct member having outlet means arranged to pour said liquid onto material in the receptacle.

2. An apparatus as claimed in claim 1 wherein the duct member and the receptacle are suspended by suspension means which lie along the longitudinal axis of the chamber and which are coupled to the container above the duct member such that during treatment the liquid vortex extending up to the duct member does not contact the suspension means.

3. An apparatus for treatment of material with liquid comprising:
    a container comprising a bottom portion and a lid portion, the container having defined therein a substantially cylindrical chamber having a longitudinal axis, an interior and a side;
    a receptacle for holding the material to be treated, said receptacle having a bottom wall permeable to a treatment liquid to be used in the apparatus, said bottom wall being arranged above the bottom portion of the container;
    stirring means capable of driving up the side of the chamber a vortex of said liquid having a direction of flow, the surface of said liquid at rest being lower than the bottom wall of the receptacle; and
    a duct member arranged diametrically across the interior of the chamber above the receptacle at a height to which the liquid vortex in the chamber can be driven by the stirring means, the duct member comprising an elongate element defining a longitudinal bore having an axis which lies below the center of the duct member whereby the element defining the bore is thicker above the bore than below the bore, the duct member being suspended by a suspension member which lies along the longitudinal axis of the chamber and which has a first end portion threaded above the bore into the element defining the bore and another end portion coupled to the container, the end portion of the suspension member being threaded such that during treatment the vortex urges the duct member more tightly onto the suspension member, wherein the duct member has opposite ends, each of said ends comprising an inlet disposed for ingress of said liquid forming the vortex into the duct member, the duct member having outlet means arranged to pour said liquid onto material in the receptacle.

4. An apparatus as claimed in claim 3, wherein the duct member is suspended by suspension means coupled to the lid portion of the apparatus.

5. An apparatus as claimed in claim 3, wherein the receptacle is suspended from the duct member.

6. An apparatus as claimed in claim 3, wherein each inlet of the duct member when viewed along lines within the chamber in a direction parallel to the longitudinal axis of the chamber has a profile which is of a concave arc of a circle opening in a direction opposite to that of the flow of the vortex.

7. An apparatus as claimed in claim 3, wherein the cross-sectional area of the outlet means is at least as large as the total cross-sectional area of the inlets.

8. An apparatus as claimed in claim 3, wherein the ends of the duct member are convexly profiled complementarily to the curvature of the side wall of the chamber.

9. An apparatus as claimed in claim 3, wherein the ends of the duct member are spaced apart from the chamber side by a small clearance.

10. An apparatus as claimed in claim 3, wherein the cylindrical chamber is pneumatically sealable from the atmosphere whereby the apparatus is adapted for operation at elevated pressure.

11. An apparatus as claimed in claim 10, which further comprises means for measuring pressure in the chamber.

12. An apparatus as claimed in claim 3, which further comprises liquid distribution means whereby liquid may be poured from the duct onto material in the receptacle relatively evenly over the material.

13. An apparatus as claimed in claim 12, wherein the liquid distribution means comprises an apertured plate provided between the bottom surface and a top rim of the receptacle.

14. An apparatus as claimed in claim 13, which further comprises vent means provided in side walls of the receptacle below the apertured plate.

15. An apparatus as claimed in claim 3, wherein the duct member and the receptacle are suspended by suspension means coupled to the container above the duct member such that durnig treatment the liquid vortex extending up to the duct member does not contact the suspension means.

16. An apparatus for treatment of material with liquid, comprising:
a container comprising a bottom portion and a lid portion, the container having defined therein a substantially cylindrical chamber having a longitudinal axis, an interior and a side;
a receptacle for holding the material to be treated, said receptacle having a bottom wall permeable to a treatment liquid to be used in the apparatus and being suspended above the bottom portion of the container;
stirring means capable of inducing a vortex having a direction of flow and said vortex of said liquid running up the side of the chamber of the container, the surface of said liquid when at rest being lower than the bottom wall of the receptacle; and
a duct member suspended diametrically across the interior of the chamber above the receptacle at a height to which the liquid vortex in the chamber can be driven by the stirring means, the duct member comprising an elongate element in which a longitudinal bore is defined having an axis which lies below the center of the duct member whereby the wall defining the bore is thicker above the bore than below the bore, the duct member being suspended by a suspension member which lies along the longitudinal axis of the chamber having a first end portion threaded above the bore into the element defining the bore and another end portion coupled to the container, the end portion of the suspension member being threaded such that durning treatment the vortex urges the duct member more tightly onto the suspension member, the duct member having opposite ends, each of said ends being provided with an inlet for ingress of liquid forming the vortex into the duct member, each inlet having a profile of a concave arc of a circle opening in a direction opposite to that of the flow of the vortex when viewed along lines which lie within the chamber parallel to the longitudinal axis of the chamber, the duct member having outlet means arranged to pour said liquid onto material in the receptacle, wherein the duct member and the receptacle are suspended by suspension means which lie along the longitudinal axis of the chamber, said suspension means being coupled to the container above the duct member such that in use the liquid vortex extending up to the duct member does not contact the suspension means.

17. An apparatus for treatment of material with liquid, comprising:
a container having defined therein a substantially cylindrical chamber having a longitudinal axis, an interior and a side;
a receptacle for holding the material for treatment, said receptacle being spaced above the bottom of the container and provided with a bottom wall permeable to a liquid to be used for treatment;
means capable of driving up the side of the chamber a vortex of liquid having a direction of flow, the surface of which said liquid when at rest is lower than the bottom wall of the receptacle; and
a duct member arranged diametrically across the chamber interior, said duct member having opposite ends, each of said ends being provided with an inlet disposed for ingress of said liquid forming the vortex into the duct member, the duct member being arranged to conduct the liquid to an outlet spaced above a top rim of the receptacle, wherein:
(a) the liquid receiving means are provided with inlets at opposite duct ends to receive the liquid, said inlets having a profile of a concave arc of a circle opening in a direction opposite to that of the direction of flow of the liquid vortex when viewed along lines within the chamber parallel to the longitudinal axis of the chamber; or
(b)
(i) the duct member comprises an elongate element defining a longitudinal bore having an axis which lies below the center of the duct member, whereby the element defining the bore is thicker above the bore than below the bore, the outlet above the top rim of the receptacle being defined below the bore in said element; and
(ii) a member for suspending the element being threaded into the thicker element region.

18. An apparatus as claimed in claim 17, wherein the container comprises a bottom portion and a lid portion; and
the means for driving the vortex comprises stirring means.

19. A method of treating a material with a liquid, comprising the steps of:
placing the material in the receptacle of the apparatus defined in any one of claims 3, 16 or 18;
filling the container with the liquid to a level below the bottom wall of the receptacle;
operating the apparatus to form the vortex; and
subsequently removing the treated material and liquid from the receptacle.

* * * * *